(12) United States Patent
Hartwig et al.

(10) Patent No.: US 9,909,678 B2
(45) Date of Patent: Mar. 6, 2018

(54) TWO PART VALVE

(75) Inventors: Johannes Hartwig, Seeheim-Jugenheim (DE); An Vu Van, Pfungstadt (DE)

(73) Assignee: ROSS EUROPA GmbH, Langen (DE)

( * ) Notice: Subject to any disclaimer, the term of this patent is extended or adjusted under 35 U.S.C. 154(b) by 963 days.

(21) Appl. No.: 13/814,829

(22) PCT Filed: Aug. 10, 2010

(86) PCT No.: PCT/EP2010/004885
§ 371 (c)(1),
(2), (4) Date: Feb. 20, 2013

(87) PCT Pub. No.: WO2012/019622
PCT Pub. Date: Feb. 16, 2012

(65) Prior Publication Data
US 2013/0207009 A1    Aug. 15, 2013

(51) Int. Cl.
*F15B 13/043* (2006.01)
*F16K 27/04* (2006.01)
*F15B 13/08* (2006.01)

(52) U.S. Cl.
CPC .......... *F16K 27/048* (2013.01); *F16K 27/041* (2013.01); *F15B 13/0835* (2013.01); *Y10T 137/86614* (2015.04)

(58) Field of Classification Search
CPC ...... F16K 35/025; F16K 27/048; F16K 11/07; F16K 27/041; F15B 13/0835
USPC ................. 137/625.64; 251/129.03
See application file for complete search history.

(56) References Cited

U.S. PATENT DOCUMENTS

| | | | | | |
|---|---|---|---|---|---|
| 2,861,592 | A | * | 11/1958 | Collins | 137/625.64 |
| 2,955,617 | A | * | 10/1960 | Collins | 137/625.64 |
| 2,993,510 | A | * | 7/1961 | Collins | 137/625.64 |
| 3,084,676 | A | * | 4/1963 | Herion et al. | 91/424 |
| 3,540,480 | A | * | 11/1970 | Malinowski et al. | 137/625.6 |
| 3,938,555 | A | * | 2/1976 | Swickley | 137/625.67 |
| 4,046,165 | A | * | 9/1977 | Rose et al. | 137/624.27 |
| 4,207,917 | A | * | 6/1980 | Opel et al. | 137/269 |
| 4,230,143 | A | * | 10/1980 | Dettmann et al. | 137/270 |

(Continued)

FOREIGN PATENT DOCUMENTS

| | | |
|---|---|---|
| DE | 10334206 A1 | 2/2005 |
| DE | 10354269 A1 | 6/2005 |

(Continued)

OTHER PUBLICATIONS

International Search Report & Written Opinion for PCT Application No. PCT/EP2010/004885 dated May 11, 2011.

*Primary Examiner* — Umashankar Venkatesan
(74) *Attorney, Agent, or Firm* — Carlson, Gaskey & Olds, P.C.

(57) ABSTRACT

A valve (10) includes a first valve housing portion (12) and a second valve housing portion (14). The first valve housing portion and the second valve housing portion are separate components attached together to define a valve housing. The first valve housing portion includes an inner end surface (16) having an opening (18). The second valve housing portion includes an inner end surface (56) having a protruding annular rim (60) with an annular groove (62) and a seal (64) is received in the annular groove. The protruding annular rim including the seal is received in the opening in the inner end surface of the first valve housing portion to define a valve housing.

20 Claims, 3 Drawing Sheets

(56) References Cited

U.S. PATENT DOCUMENTS

| | | | | |
|---|---|---|---|---|
| 4,527,592 A * | 7/1985 | Dotti et al. | ............... | 137/625.61 |
| 4,620,567 A * | 11/1986 | Kurtz | .................... | B60T 15/027 |
| | | | | 137/627.5 |
| 5,732,678 A * | 3/1998 | Lindquist et al. | ............ | 123/446 |
| 5,964,244 A * | 10/1999 | Hiramatsu et al. | ........... | 137/270 |
| 6,065,487 A * | 5/2000 | Watson | .......................... | 137/271 |
| 6,155,287 A * | 12/2000 | Matarai et al. | ............... | 137/382 |
| 6,286,535 B1 * | 9/2001 | Harms | ................ | F15B 13/0402 |
| | | | | 137/625.64 |
| 6,425,416 B1 | 7/2002 | Narita et al. | | |
| 6,571,828 B2 * | 6/2003 | Harms et al. | ............ | 137/625.61 |
| 6,820,859 B2 * | 11/2004 | Miyazoe et al. | ............... | 251/367 |
| 6,926,033 B2 * | 8/2005 | Harms et al. | ............ | 137/625.61 |
| 7,591,280 B2 * | 9/2009 | Narita | ................. | F15B 13/0814 |
| | | | | 137/269 |
| 2013/0255809 A1 * | 10/2013 | Bruck | ................ | F15B 13/0433 |
| | | | | 137/625.6 |
| 2013/0334450 A1 | 12/2013 | Proulx et al. | | |

FOREIGN PATENT DOCUMENTS

| | | |
|---|---|---|
| DE | 102006024762 | 12/2007 |
| DE | 102006024762 A1 | 12/2007 |
| DE | 102007007645 B3 | 10/2008 |
| WO | 08/081331 | 10/2002 |

* cited by examiner

TWO PART VALVE

This application is a United States National Phase of PCT Application No. PCT/EP2010/004885 filed on Aug. 10, 2012.

BACKGROUND OF THE INVENTION

The present invention relates generally to a two part valve.

A valve includes a solenoid located on one side of a valve housing and a cartridge inserted into an opening in an opposing side of the valve housing. A plug is inserted into the hole to retain the cartridge in the valve housing. If the cartridge or any other internal components need to be serviced or removed, the entire valve must be removed to access the opening in the opposing side of the valve housing.

In another valve, the cartridge is positioned in the housing from a top of the valve housing. A lid is placed over the valve housing to enclose the cartridge, and the lid is secured in place by screws or a circlip.

SUMMARY OF THE INVENTION

A valve includes a first valve housing portion and a second valve housing portion. The first valve housing portion and the second valve housing portion are separate components attached together to define a valve housing. The first valve housing portion includes an inner end surface having an opening. The second valve housing portion includes an inner end surface having a protruding annular rim with an annular groove, and a seal is received in the annular groove. The protruding annular rim including the seal is received in the opening in the inner end surface of the first valve housing portion to define a valve housing.

In another exemplary embodiment, a valve includes a first valve housing portion and a second valve housing portion. The first valve housing portion and the second valve housing portion are separate components attached together to define a valve housing. The first valve housing portion includes an inner end surface having an opening defining a passage. The first valve housing portion includes an inlet port, an outlet port, and an exhaust port. A cartridge including a poppet is received in the passage, and the poppet moves relative to the valve housing portions to control flow of a fluid through the valve. The second valve housing portion includes a pilot. The second valve housing portion includes an inner end surface having a protruding annular rim with an annular groove, and a seal is received in the annular groove. The protruding annular rim including the seal is received in the opening in the inner end surface of the first valve housing portion to define a valve housing.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF PREFERRED EMBODIMENTS

Figure 1:
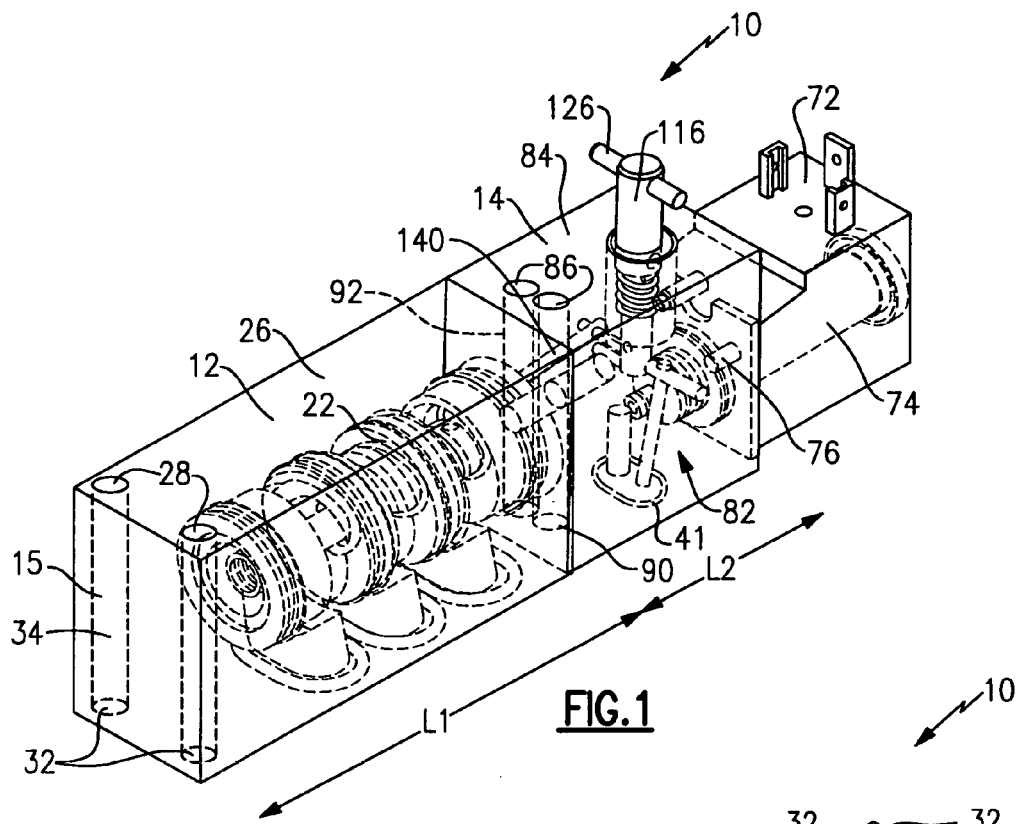
FIG. 1 illustrates an isometric perspective view of a valve.
Figure 3:
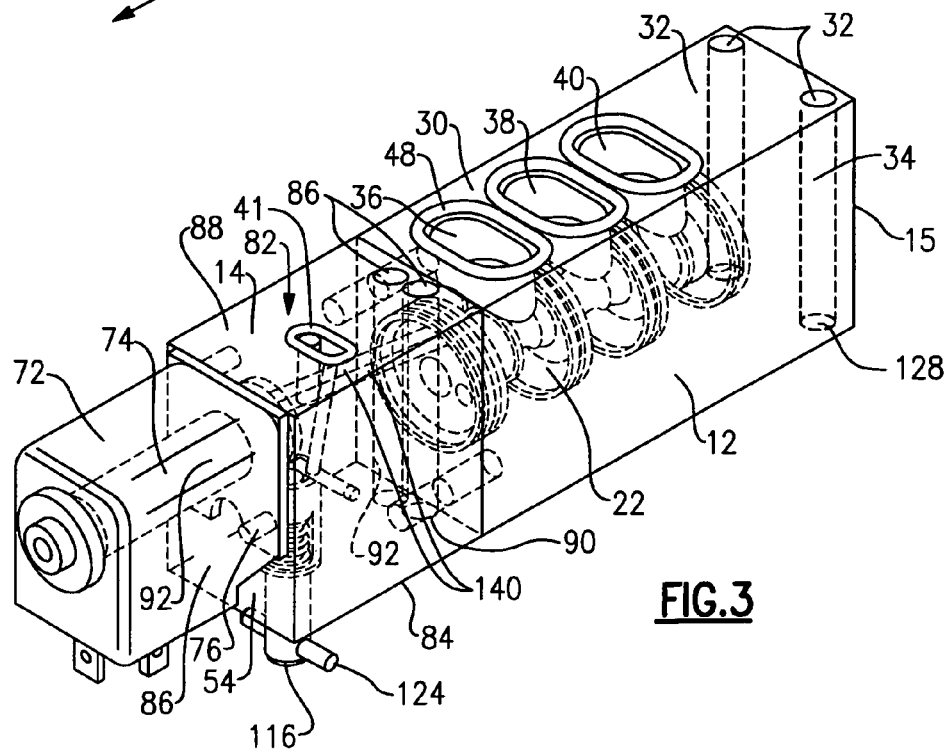
FIG. 3 illustrates a bottom isometric perspective view of the valve.
Figure 2:
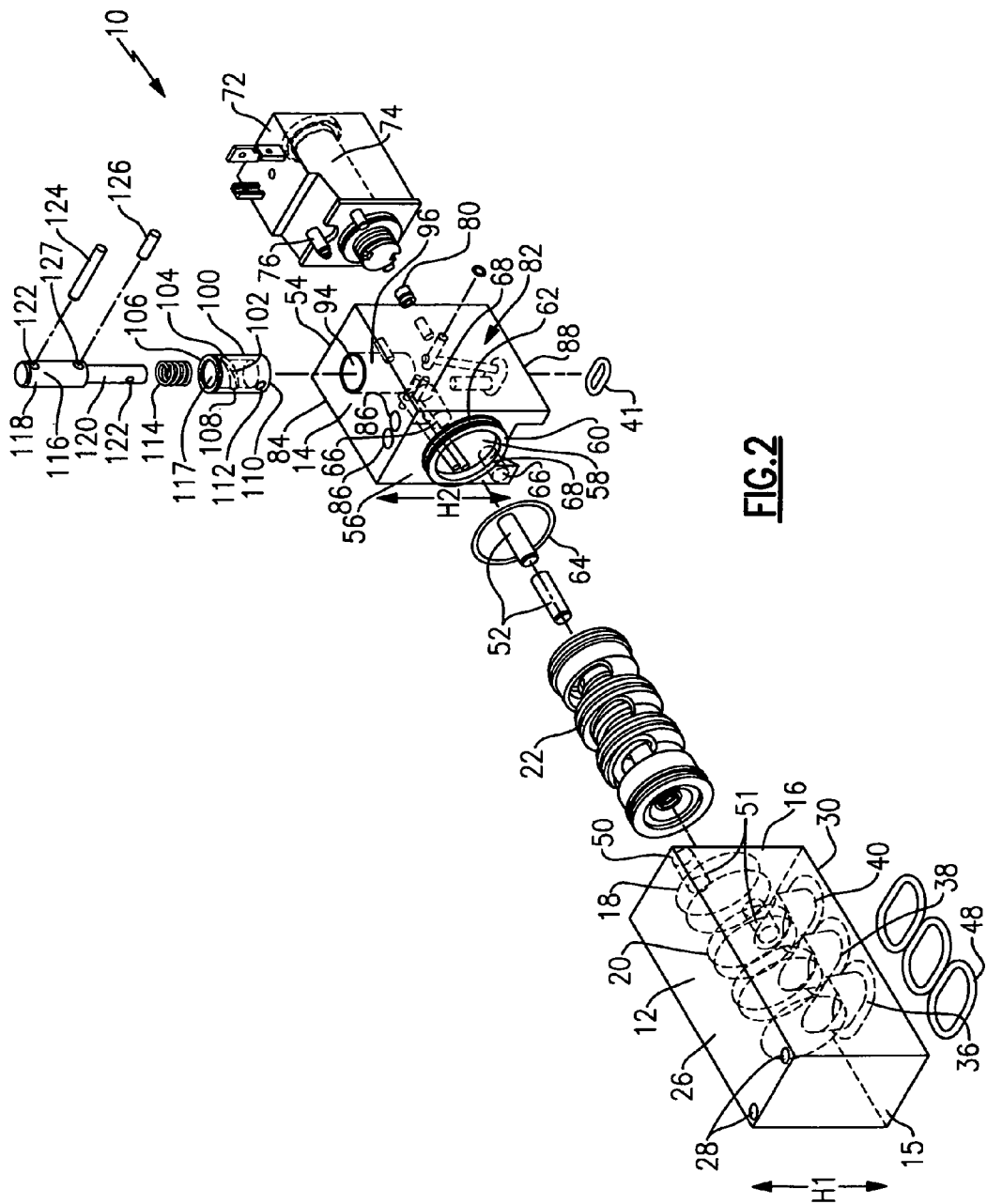
FIG. 2 illustrates an exploded perspective view of the valve.

FIGS. 1, 2 and 3 illustrate a two part valve 10 that controls the flow of a fluid. In one example, the fluid is air. The valve 10 includes a first valve housing portion 12 and a second valve housing portion 14 that are separate components. The first valve housing portion 12 has a first length L1, and the second valve housing portion 14 has a second length L2, and L1 is greater than L2. In one example, L1 is significantly greater than L2. The first valve housing portion 12 includes an outer end surface 15 and an opposing inner end surface 16. When the valve 10 is assembled, the inner end surface 16 contacts an inner end surface 56 of the second valve housing portion 14. The inner end surface 16 includes an opening 18 that defines a passage 20 within the first valve housing portion 12. A cartridge 22 including a poppet/stem assembly 24 is received in the passage 20. The poppet/stem assembly 24 is moveable relative to the first valve housing portion 12 to control the flow of the fluid through the valve 10.

A top surface 26 of the first valve housing portion 12 includes at least one aperture 28. The bottom surface 30 of the first valve housing portion 12 includes at least one aperture 32 aligned with the at least one aperture 28 of the top surface 26 to define a passage 34 that extends through a height H1 of the first valve housing portion 12. In one example, there are two passages 34 positioned near the outer end surface 15 of the first valve housing portion 12. Each passage 34 receives a fastener (not shown) to attach the valve 10 to a base (not shown). In another example, an orthogonal force is applied by a clamping mechanism to attach the valve 10 to the base.

The bottom surface 30 includes an inlet port 36, an outlet port 38, and an exhaust port 40. An inlet passage 42, an outlet passage 44, and an exhaust passage 46 are in fluid communication with the inlet port 36, the outlet port 38, and the exhaust port 40, respectively. The flow of the fluid through the passages 42, 44 and 46 is controlled by the position of the poppet/stem assembly 24 in the first valve housing portion 12. A seal 48 is located in each of the ports 36, 38 and 40, respectively, to prevent leakage of the fluid. In one example, the seal 48 is an o-ring.

The inner end surface 16 also includes a plurality of holes 50 that each define a passage 51. In one example, a hole 50 is located in an upper corner of the inner end surface 16, and a hole 50 is located in an opposing lower corner of the inner end surface 16. The passages 51 each receive a pin 52 to secure the first valve housing portion 12 to the second valve housing portion 14, as described below.

The second valve housing portion 14 includes an outer end surface 54 and the opposing inner end surface 56. The inner end surface 56 includes an opening 58 surround by a protruding annular rim 60 having an annular groove 62. A seal 64 is received in the annular groove 62. In one example, the seal 64 is an o-ring. The annular rim 60 is sized to fit within the opening 18 of the first valve housing portion 12. Alternatively, the first valve housing portion 12 includes the annular rim 60, and the second valve housing portion 14 includes the opening 18.

The inner end surface 56 also includes a plurality of holes 66 that each define a passage 68. In one example, a hole 66 is located in an upper corner of the inner end surface 56, and a hole 66 is located in an opposing lower corner of the inner end surface 56. The holes 66 each receive the pin 52 to secure the first valve housing portion 12 against rotation related to the second valve housing portion 14.

A magnet 72 is attached to the outer end surface 54 of the second valve housing portion 14 with a fastener 74. The magnet 72 includes a plurality of projections 76 that are each located and sized to be received in one of a plurality of holes (not shown) on the outer end surface 54 of the second valve housing portion 14. Alternately, the second valve housing portion 14 can include the plurality of projections 76, and the magnet 72 can include the plurality of holes. A rod 80 is located in a hole (not shown) in the outer end surface 54 of the second valve housing portion 14. When the magnet 72 is actuated to actuate the valve 10, the magnet 72 moves the rod 80 to actuate a pilot 82.

A top surface 84 of the second valve housing portion 14 includes at least one aperture 86. A bottom surface 88 of the second valve housing portion 14 includes at least one aperture 90 aligned with the at least one aperture 86 of the top surface 84 to define a passage 92 that extends through a height H2 of the second valve housing portion 14. In one example, there are two passages 92 positioned near the outer end surface 54 of the second valve housing portion 14. Each passage 92 receives a fastener (not shown) to attach the valve 10 to the base (not shown).

The second valve housing portion 14 also include an opening 94 on the top surface 84 that defines a passage 96 that receives a hand operative manual release 98. The hand operative manual release 98 includes a cylinder 100 that is received in the passage 96. The cylinder 100 includes a groove 102 having a first end 104 that is closer to an upper end 106 of the cylinder 100 and a second end 108 that is closer to a lower end 110 of the cylinder 100. In one example, the groove 102 is diagonal. The cylinder 100 also includes an aperture 112 that engages a structure (not shown) in the second valve housing portion 14 to prevent rotation of the cylinder 100 relative to the second valve housing portion 14. A resilient member 114 is located in a hollow portion 117 of the cylinder 100. In one example, the resilient member 114 is a spring.

The hand operative manual release 98 also includes a handle body 116 including an upper portion 118 and a lower portion 120, and the upper portion 118 has a larger diameter than the lower portion 120. The upper portion 118 includes an upper set of aligned apertures 122 near a top of the upper portion 118 of the handle body 116 and a lower set of aligned apertures 127 near a bottom of the upper portion 118 of the handle body 116. The lower portion 120 also includes an aperture 122. The resilient member 114 surrounds the lower portion 120 of the handle body 116 that is received in the hollow portion 117 of the cylinder 100. The resilient member 114 biases the handle body 116 upwardly.

A grip rod 124 is received in the upper set of aligned apertures 122. A groove rod 126 is received in the lower set of aligned apertures 127 and extends into the groove 102 of the cylinder 100. The aperture 122 of the lower portion 120 of the hand operative manual release 98 allows for the flow of pilot air through the aperture 122 when the hand operative manual release 98 is actuated to manually actuate the valve 10. The cylinder 100 is received in the opening 94 on the top surface 84 of the second valve housing portion 14. The length of the groove 102 controls the degree of movement of the handle body 116.

The bottom surface 88 also includes a pilot port 128 that is in fluid communication with pilot passages 140 of the pilot 82. The pilot 82 provides the pilot air intake that flows through tubes 140 to actuate the valve 10. The pilot 82 is actuated by the magnet 72 or the hand operative manual release 98. A seal 41 is located around the pilot port 128.

If manual actuation is needed, the grip rod 124 is actuated by an operator. Prior to manual actuation, the groove rod 126 is located at the first end 104 of the groove 102. To manually actuate the valve 10, the grip rod 124 is pushed downwardly and rotated, compressing the resilient member 114 and rotating and translating the handle body 116 relative to the stationary cylinder 100. As the handle body 116 rotates and translates, the groove rod 126 travels in the groove 102 until the groove rod 126 contacts the second end 108 of the groove 102. Therefore, the user must both push the handle body 116 downwardly towards the valve 10 and rotate the handle body 116 to actuate the hand operative manual release 98. In one example, the grip rod 124 rotates approximately 90°. Once the grip rod 124 has rotated, the aperture 122 of the lower portion 120 of the handle body 116 is aligned with the pilot 82, allowing the flow of pilot air to move the poppet/stem assembly 24 and actuate the valve 10.

When the valve 10 is to be assembled, the cartridge 22 is inserted into the passage 20 of the first valve housing member 12. The protruding annular rim 60 with the seal 64 in the annular groove 62 of the second valve housing portion 14 is inserted into the opening 18 of the inner end surface 56 of the first valve housing portion 12 until the inner end surfaces 16 and 56 contact. The friction of the seal 64 of the opening 18 of the inner end surface 56 of the first valve housing portion 12 retains the valve housing portions 12 and 14 together. The seal 64 also provides a sealing function. The pins 52 are received in the aligned holes 50 and 66 on the inner end surfaces 16 and 56, respectively, of the valve housing portions 12 and 14, respectively, to further provide stability and security of the valve housing portions 12 and 14 to each other. The friction of the seal 64 and the pins 52 and 66 ensures that the valve housing portions 12 and 14 are retained together before the valve 10 is mounted and also provide sealing. Once mounted, the valve housing portions 12 and 14 will not separate. Once the valve 10 is assembled, fasteners are located in the passages 34 and 92 to secure the valve 10 to the base (not shown). However, if the cartridge 22 or other internal valve components need to be accessed for replacement or service, the second valve housing portion 14 can be quickly separated from the first valve housing portion 12 to allow access to the cartridge 22 and the internal components.

Figure 4:
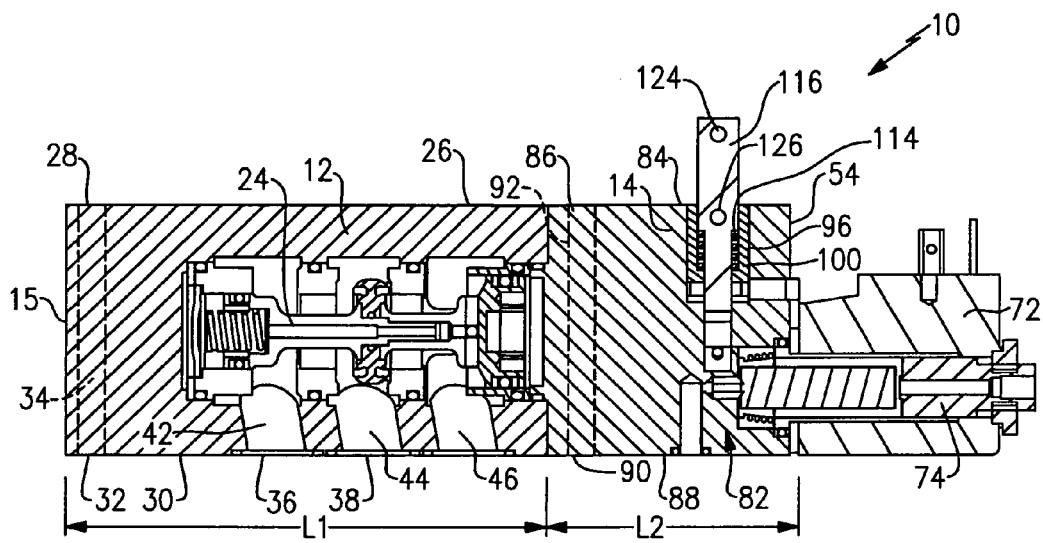
FIG. 4 illustrates a cross sectional view of a normally open valve when a pilot is de-energized.

FIG. 4 illustrates a normally open valve 10. Fluid flows into the inlet port 36 and exits through the outlet port 38 to perform a function. When the valve 10 is actuated by the magnet 72 or hand operative manual release 98, pilot air flows through the passages 140 to move the poppet/stem assembly 24 of the cartridge 22, blocking the flow of fluid from the inlet port 36 to the outlet port 38. Fluid is then exhausted through the exhaust port 40. When the pilot air supply is deactivated, the valve 10 returns to the normally open position.

Figure 5:
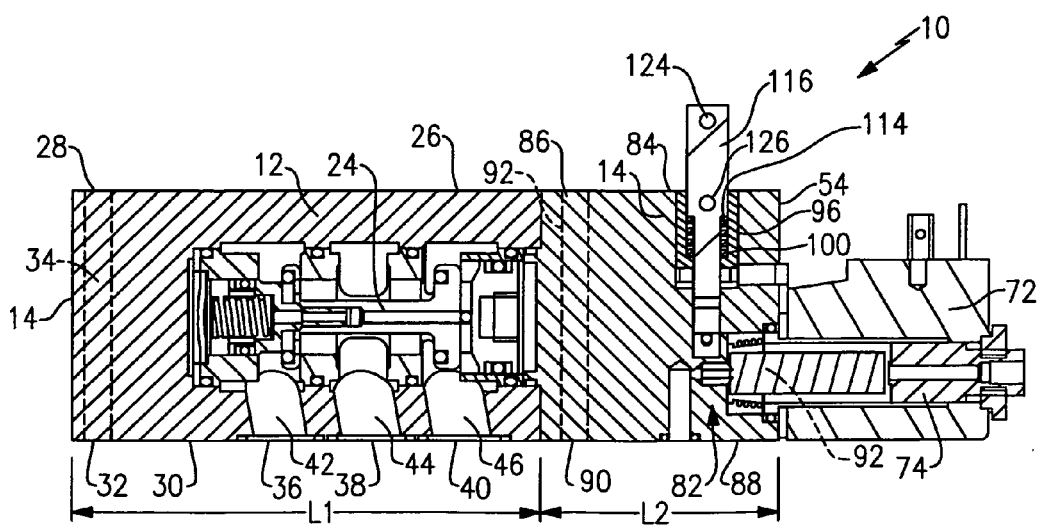
FIG. 5 illustrates a cross sectional view of a normally closed valve when the pilot is de-energized.

FIG. 5 illustrates a normally closed valve 10. Fluid does not flow from the inlet port 36 to the outlet port 38 and is exhausted through the exhaust port 40. When the valve 10 is actuated by the magnet 72 or the hand operative manual release 98, pilot air flows through the pilot passages 140 to move the poppet/stem assembly 24 of the cartridge 22, allowing the flow of fluid from the inlet port 36 to the outlet port 38 to perform a function. When the pilot air supply is deactivated, the valve 10 returns to the normally closed position.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A valve comprising:
a first valve housing portion including an inner end surface having one of an opening and a protruding annular rim with an annular groove; and
a second valve housing portion including an inner end surface having the other of the opening and the protruding annular rim, wherein a seal is received in the annular groove, the second valve housing portion includes a passage, and a manual release is located in the passage;
a pilot that actuates the valve; and
a magnet attached to the second valve housing portion that actuates the pilot to actuate the valve, wherein the magnet is attached to an outer end surface of the second valve housing;
wherein the first valve housing portion and the second valve housing portion are separate components attached together to define a valve housing, and the protruding annular rim is received in the opening to define the valve housing.

2. The valve as recited in claim 1 wherein the first valve housing portion includes the opening that defines a passage, and a cartridge including a poppet is received in the passage.

3. The valve as recited in claim 2 wherein the first housing portion includes an inlet port, an outlet port, and an exhaust port, and the poppet moves relative to the first valve housing portion to control flow of a fluid through the valve.

4. The valve as recited claim 2 wherein the first valve housing portion and the second valve housing portion each include a fastener passage extending from a top surface to a bottom surface of the first valve housing portion and the second valve housing portion, respectively, and a fastener is received in each of the fastener passages to retain the valve housing portions to a base.

5. The valve as recited in claim 1 wherein the inner end surface of the first valve housing portion includes a first aperture and the inner end surface of the second valve housing includes a second aperture that aligns with the first aperture when the valve is assembled, and a fastener is received in the aligned apertures.

6. The valve as recited in claim 1 wherein the second valve housing portion includes an outer end surface, and the magnet is attached to the outer end surface.

7. The valve as recited in claim 1 wherein the second valve housing portion includes an upper surface including an opening that defines the passage that receives the manual release for the pilot.

8. The valve as recited in claim 7 wherein the manual release includes a cylinder having a hollow interior and a diagonal groove on an exterior surface of the cylinder, the diagonal groove having a first end and a second end, the manual release including a resilient member received in the hollow interior and a handle body having an upper portion and a lower portion,
wherein the resilient member surrounds the lower portion of the handle body and biases the handle body upwardly, and a groove rod is received in the upper portion of the handle portion and the diagonal groove of the cylinder, and
wherein the handle body is moveable to manually actuate the pilot by pressing the handle body downwardly and rotating the handle body, and the groove rod slides from the first end to the second end of the cylinder as the handle body is rotated relative to the cylinder.

9. The valve as recited in claim 8 wherein the groove rod moves in the diagonal groove as the handle body is moved, and a length of the diagonal groove controls an amount of movement of the handle body, and when an aperture in the handle body is aligned with a pilot passage, pilot air flows through pilot passages and manually actuates the valve.

10. The valve as recited in claim 1 wherein a clamping mechanism retains the valve housing portions to a base.

11. A valve comprising:
a first valve housing portion including an inner end surface having an opening defining a passage, the first housing portion including an inlet port, an outlet port, and an exhaust port;
a cartridge including a poppet received in the passage, wherein the poppet moves relative to the first valve housing portion to control flow of a fluid through the valve; and
a second valve housing portion including an inner end surface having a protruding annular rim with an annular groove, and a seal is received in the annular groove, the second valve housing portion includes a passage, and a manual release is located in the passage;
a magnet attached to the second valve housing portion that actuates a pilot, wherein the magnet is attached to an outer end surface of the second valve housing;
a pilot that actuates the valve,
wherein the protruding annular rim is received in the opening to define a valve housing, and the second valve housing portion includes the pilot, and
wherein the first valve housing portion and the second valve housing portion are separate components.

12. The valve as recited in claim 11 wherein the first valve housing portion and the second valve housing portion each include a passage extending from a top surface to a bottom surface of the first valve housing portion and the second valve housing portion, respectively, and a fastener is received in each of the passages to retain the valve housing portions to a base.

13. The valve as recited in claim 11 wherein the inner end surface of the first valve housing portion includes a first aperture and the inner end surface of the second valve housing includes a second aperture that aligns with the first aperture when the valve is assembled, and a fastener is received in the aligned apertures.

14. The valve as recited in claim 11 wherein the second valve housing portion includes an outer end surface, and the magnet is attached to the outer end surface.

15. The valve as recited in claim 11 wherein the second valve housing portion includes an upper surface including an opening that defines the passage the receives the manual release for the pilot.

16. The valve as recited in claim 15 wherein the manual release includes a cylinder having a hollow interior and a diagonal groove on an exterior surface of the cylinder, the diagonal groove having a first end and a second end, the manual release including a resilient member received in the hollow interior and a handle body having an upper portion and a lower portion, wherein the resilient member surrounds the lower portion of the handle body and biases the handle body upwardly, and a groove rod is received in the upper portion of the handle portion and the diagonal groove of the cylinder, and wherein the handle body is moveable to manually actuate the pilot by pressing the handle body downwardly and rotating the handle body, and the groove rod slides from the first end to the second end of the cylinder as the handle body is rotated relative to the cylinder.

17. The valve as recited in claim 16 wherein the groove rod moves in the diagonal groove as the handle body is moved, and a length of the diagonal groove controls an amount of movement of the handle body, and when an aperture in the handle body is aligned with a pilot passage, pilot air flows through pilot passages and manually actuates the valve.

18. The valve as recited in claim 1 wherein the magnet is external of the second valve housing.

19. The valve as recited in claim 4 wherein a longitudinal axis of the fastener is substantially perpendicular to a longitudinal axis of the cartridge.

20. The valve as recited in claim 1 wherein the pilot valve and the manual release share a common passage.

\* \* \* \* \*

UNITED STATES PATENT AND TRADEMARK OFFICE
CERTIFICATE OF CORRECTION

PATENT NO. : 9,909,678 B2
APPLICATION NO. : 13/814829
DATED : March 6, 2018
INVENTOR(S) : Johannes Hartwig et al.

Page 1 of 1

It is certified that error appears in the above-identified patent and that said Letters Patent is hereby corrected as shown below:

In the Claims

In Claim 5, Column 5, Line 53; replace "second valve housing" with --second valve housing portion--

In Claim 11, Column 6, Line 24; replace "first housing portion" with --first valve housing portion--

In Claim 11, Column 6, Line 38; replace "second valve housing" with --second valve housing portion--

In Claim 13, Column 6, Line 54; replace "second valve housing" with --second valve housing portion--

In Claim 15, Column 6, Line 63; replace "passage the receives" with --passage that receives--

In Claim 16, Column 7, Line 8; replace "handle portion" with --handle body--

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*